July 9, 1968  S. O. S. H. SVENSSON  3,391,745
APPARATUS FOR OPERATING PROPELLERS
Filed Sept. 16, 1966
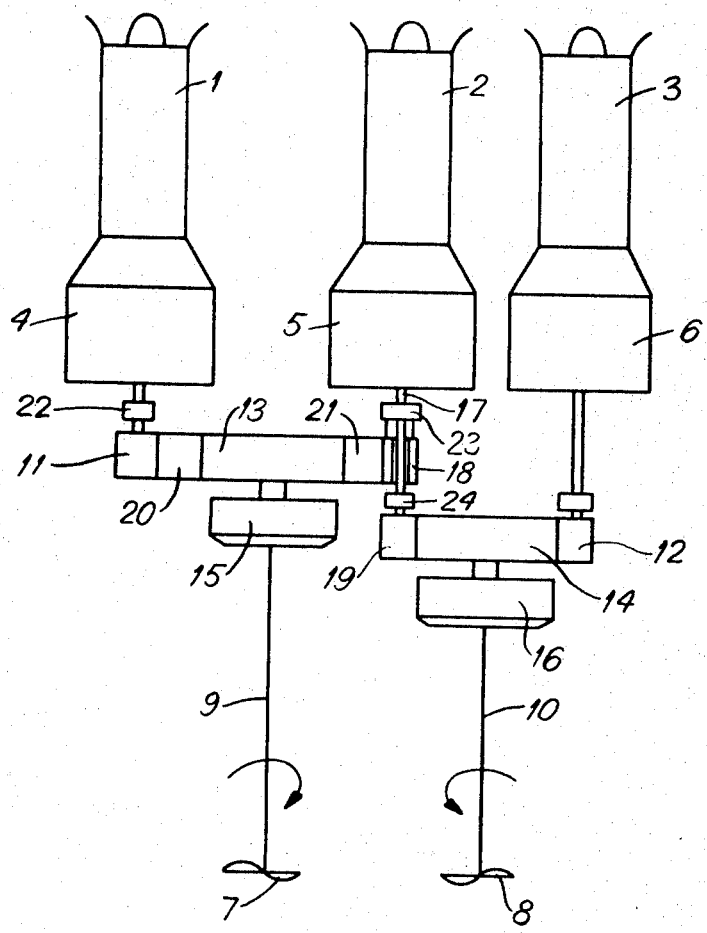
INVENTOR.
Stig Olof Sven Harald Svensson
BY
ATTORNEY

United States Patent Office 3,391,745
Patented July 9, 1968

3,391,745
APPARATUS FOR OPERATING PROPELLERS
Stig Olof Sven Harald Svensson, Norrkoping, Sweden, assignor to Stal-Laval Turbin AB, Finspang, Sweden
Filed Sept. 16, 1966, Ser. No. 580,088
Claims priority, application Sweden, June 16, 1966,
8,230/66
4 Claims. (Cl. 170—135.2)

This invention relates to apparatus primarily adapted for use in operating or driving two propellers such as are employed for marine use, and with the propellers arranged in parallel and driven in opposite directions by reduction gearing.

It is an object of the invention to provide a propeller drive of this character by which each propeller can be coupled or connected to an engine for full-speed operation and in which there is provided a separate engine for cruising speed operation, with the latter engine being capable of being coupled to the gears of one or both of the propellers through the use of two pinions disposed in series on a turbine shaft. With an arrangement of this character, only one cruising-speed engine is required, such as for example, a gas turbine provided with a gas generator.

With the above and other objects to be hereinafter set forth in view, I have devised the arrangement of parts to be described and more particularly pointed out in the claims appended hereto.

In the accompanying drawing there is illustratively and diagrammatically shown an arrangement constructed in accordance with the present invention.

Referring to the drawing, 1, 2 and 3 designate respectively gas generators, each of which is composed of the following main components namely, compressors, combusters and turbines for operating the compressors. The gas generators supply driving gas to the power turbines which are respectively shown at 4, 5 and 6 and of which the turbines shown at 4 and 6 are intended for full-speed, individual operation of its own propeller, the propeller shown at 7 being operated by the turbine 4, and the propeller shown at 8 being operated by the turbine 6. The propeller 7 is mounted on the shaft 9 and the propeller shown at 8 is mounted on the shaft 10, the two shafts 9 and 10 being disposed in parallel relation.

The shaft of turbine 4 carries a pinion 11, meshing with the pinion 20 which engages a gear wheel 13 driving planetary gearing 15, driving the shaft 9. The shaft of turbine 6 carries a pinion 12 meshing with the gear wheel 14, driving planetary gearing 16 which drives the shaft 10. The two shafts 9 and 10 are driven in opposite directions as indicated by the arrows in the drawing.

The turbine shown at 5 is intended for cruising speed. An outgoing turbine shaft shown at 17 is intended for two series-mounted pinions 18 and 19, the pinion 18 being provided with a center hole for the passage of the shaft 17. In order to provide for the rotation of the two propellers 7 and 8 in opposite directions, the reversing gear wheels 20 and 21 are mounted between the pinion 18 and the gear wheel 13 and between the pinion 11 that is powered by the power turbine 4 and the gear wheel.

Clutches 22 are provided between the pinions 11 and 12 and the respective power turbines, and to permit the turbine 5 to be connected to either propeller or to both propellers, clutches 23 and 24 are provided for the pinions 18 and 19 respectively.

Through the arrangement described, each propeller can be connected to its engine or turbine for full-speed operation, and in addition the engine or turbine 5 can be coupled to one or the other of the propeller-drive gear wheels 13 and 14 through the two pinions 18 and 19 by means of the two clutches 23 and 24 which are mounted in series on the turbine shaft 17.

It will be understood that engines other than gas turbines can be used, such as diesel engines for example. Controllable pitch propellers are suitable so that different loads can be carried by each of the propellers to augment maneuvering.

Having thus described an embodiment of the invention, it is obvious that the same is not to be restricted thereto, but is broad enough to cover all structures coming within the scope of the annexed claims.

What I claim is:
1. An apparatus for operating two propellers arranged in parallel comprising, a pair of engines, each of which is operative to drive one of the propellers for full-speed operation, a third engine employed for cruising-speed operation and capable of being coupled to one or the other or both of the propellers, a gear wheel for each propeller, and pinions mounted in series on the shaft of the third engine for engagement with the gear wheels.
2. An apparatus according to claim 1, characterized in which the engines are gas turbines.
3. An apparatus according to claim 1 in that one of the pinions is carried on a shaft that passes through a cylindrical passage in the other pinion.
4. An apparatus according to claim 1, characterized in that the propellers are of the controllable-pitch type.

References Cited

UNITED STATES PATENTS 1,747,334  2/1930  Sundstedt _____ 170—135.75 X
3,115,936  12/1963  Blews _____ 170—135.2

FOREIGN PATENTS 595,684  12/1947  Great Britain.

EVERETTE A. POWELL, JR., *Primary Examiner.*